July 1, 1941.   P. G. JOHNSON   2,248,000
CLAMP ARRANGEMENT FOR PIPE JOINTS
Filed Oct. 23, 1939   2 Sheets-Sheet 2
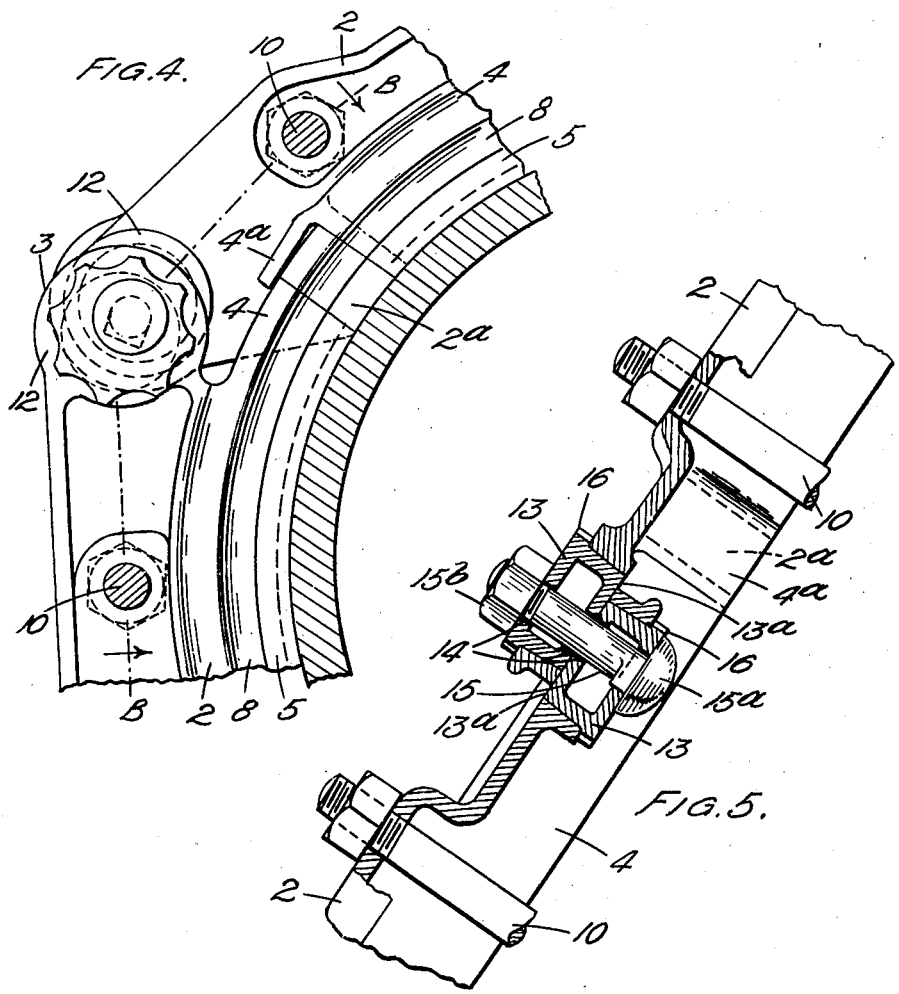

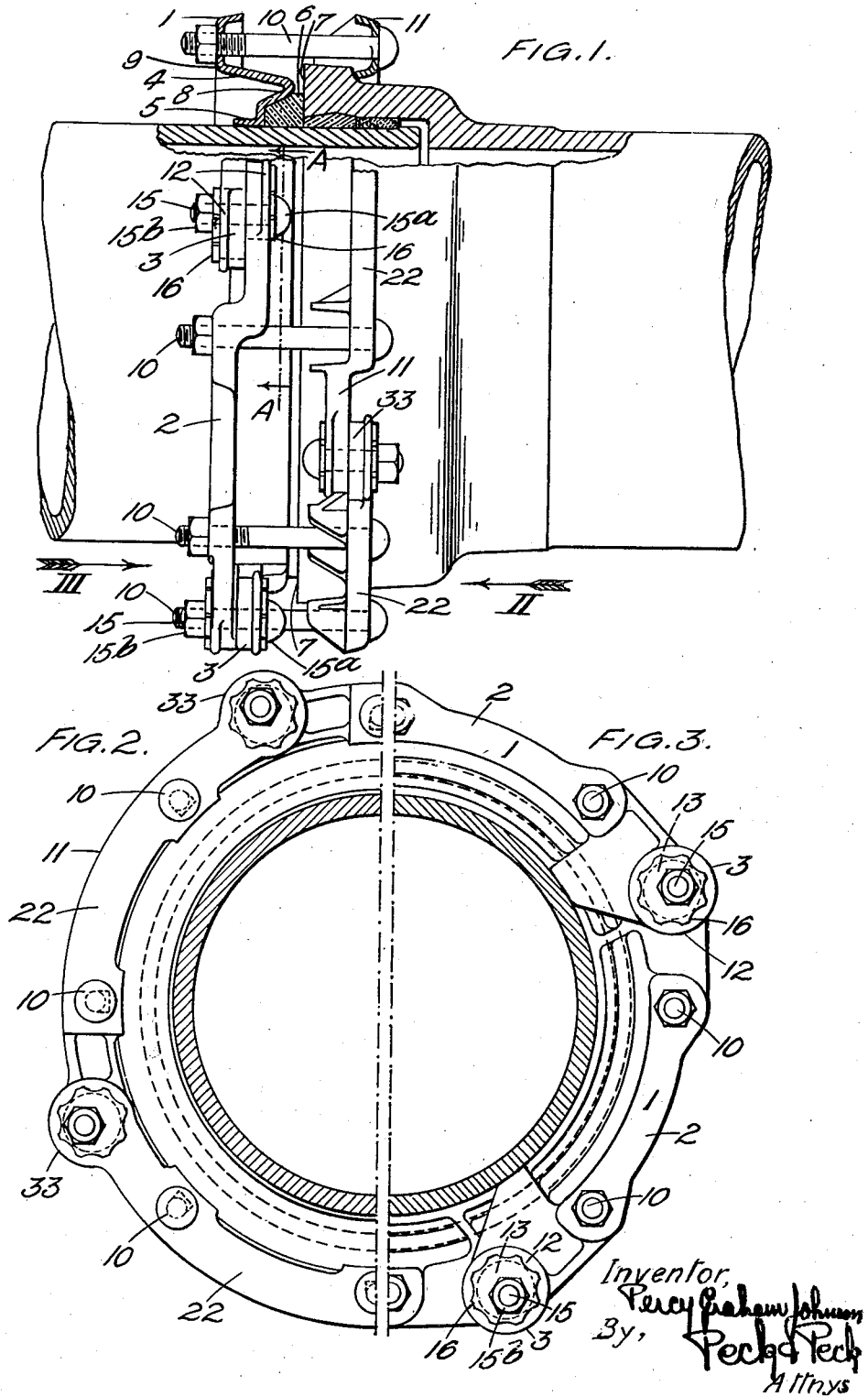

Patented July 1, 1941

2,248,000

UNITED STATES PATENT OFFICE 2,248,000

CLAMPING ARRANGEMENT FOR PIPE JOINTS

Percy Graham Johnson, London, England, assignor to Victaulic Company Limited, Millbank, London, England, a company of Great Britain Application October 23, 1939, Serial No. 300,857
In Great Britain November 22, 1938

3 Claims. (Cl. 285—135)

This invention concerns improvements relating to clamping arrangements for pipe joints, particularly for sealing leaking spigot and socket joints, made with lead in large cast iron or steel pipes.

In one effective known arrangement for such purposes, a packing consisting of a strip of heavy-section rubber composition placed, with its ends butting against each other, around the spigot pipe is compressed by a clamping device against the outside of the latter pipe and against the end face of the socket pipe. The clamping device comprises an anchor collar which embraces the socket and takes against the rear edge of an outstanding rim thereon and a front flange which embraces the spigot and is shaped for engaging and compressing the packing strip in the manner described above when it is drawn towards the anchor collar by a series of bolts extending parallel to the pipes. In this known arrangement, the collar and the flange are each composed of two, three, four or more segments which are suitably registered or interlocked together and connected by a number of small bolts.

In some respects, it proves to be a disadvantage of the above arrangement that the segments of the anchor collar and front flange must be shaped comparatively accurately to suit the external dimensions of the particular pipe with which they are to be used. Now even in the case of different "classes" of "standard" pipes of the same nominal size, there are appreciable differences in the external diameter, in some sizes as much as one inch. In the case of "non-standard" pipes, of which there are many, even larger discrepancies may be experienced.

The present invention relates to a clamping arrangement for pipe joints which is generally similar to that described above i. e. of the kind (hereinafter referred to as the kind described) having a collar element and a flange element whereof at least one of said elements is composed of two or more segments.

It is one particular object of the present invention to provide a clamping arrangement of the kind described, but which is adapted for being used with pipes having a range of different external diameters. By this means, the provision of different segments for every variation of external diameter can be avoided so that the expensive pattern work for cast segments can be reduced to a minimum.

According to the invention, in a clamping arrangement of the kind described for pipe joints at least one connection between adjacent segments of a collar or flange element is adjustable so that the total circumferential length of the annular element can be varied to suit different external pipe diameters.

The connection between the adjacent elements advantageously comprises an eccentric or cam-action device. Preferably, in order to obtain a wide range of adjustment with a device of compact form, the said device comprises two independently rotatable eccentrics or cam shaped bushes respectively engaged with the adjacent ends of the segments connected and mounted on a common pivot. Increase in the circumferential length of the annular element may be made up by distance pieces inserted between the ends of the segments.

An embodiment of the invention as applied to a clamping arrangement similar to the aforesaid known arrangement will now be described by way of example, reference being had to the accompanying drawings in which:

Fig. 1 is a side elevation, partly in longitudinal section, of a pipe joint to which the clamping arrangement has been applied;

Fig. 2 is an elevation of half of the collar element of the clamping arrangement, when viewed in the direction indicated by the arrow II in Fig. 1;

Fig. 3 is an elevation of half of the flange element of the clamping arrangement when viewed in the direction indicated by the arrow III in Fig. 1;

Fig. 4 is a fragmentary section on the line A—A of Fig. 1, showing the segments fully separated;

Fig. 5 is a section on the line B—B of Fig. 4;

Fig. 6 is a similar view to that of Fig. 5 but showing the segments butting.

Referring to the drawings, the flange element 1 of the clamping arrangement is composed of several malleable cast iron or cast steel segments 2 each connected to its neighbours by adjustable connections 3. The general cross-section of the flange 1 (Fig. 1) consists of a main web 4 of frustro-conical form having towards one end, on the inside a flange 5 for compressing the packing strip 6 longitudinally of the pipe against the socket face 7 and on the outside, an outwardly bevelled part 8 for compressing the packing strip 6 radially inwards. At the other end of the web 4 is an out-turned flange 9 through which the bolts 10 are passed for drawing up the front flange 1 to the anchor collar 11. At each connection, the web 4 of one segment is extended at 4a (Figs. 4-6) beyond the flange 5 and bevelled part 8 and is stepped outwardly to lap over the web 4 of the other segment for a short distance, other convenient overlapping formations being preferably also provided to afford good seating of the segment ends one on the other, and to form a pocket to house the distance pieces 2a.

Extending outwardly from the respective webs 4 at the ends of the segments 2 are robust eyes 13 which are so located that they lie side by side when the ends are in the aforesaid overlapping relationship. Rotatably disposed in each eye 12 is a bush 13 with eccentric holes 14, the bushes being mounted upon a common pivot bolt 15 passing through the holes 14. Integral with each eccentric bush 13 is a grip or flat knob 16 located between the respective eye 12 and the adjacent bolt head 15a or nut 15b, as the case may be, this grip or knob 16 preferably having the same eccentricity as the bush 13.

The mode of use of the device is as follows: When the bushes 13 are located with their eccentricities similarly directed, there is an intermediate degree of separation at the ends of the flanges 5 and bevel parts 8 of the segments 2. If this is giving too large an annular element for a certain pipe, the separation can be completely eliminated by turning the bushes in opposite directions, each through 90°. If the annular element is not large enough, the separation can be increased to a maximum by turning the bushes, again in opposite directions in the respectively reverse senses as compared with the separation-reducing operation. To assist in the location and fixing of required relative positions of the bushes, the abutting inner faces 13a thereof may be provided with formations which are interengageable only in the said positions. For example, one face may be provided with a shallow pointed projection and the other face with four grooves extending substantially radially from the eccentric hole 14. To effect an adjustment, the nut 15b is loosened sufficiently to allow the bushes 13 to be disengaged and turned relatively to each other and is then tightened up to lock the bushes 13 in the adjusted positions and to re-establish a screw connection between the segments.

Distance pieces 2a (Fig. 4) are provided having a contour corresponding to that of the inner flanges 5 and bevelled parts 8 and of different widths corresponding to the required degrees of separation of the ends of the segments 2.

In the example illustrated the collar element 11 of the clamping arrangement is composed of segments 22 each connected to its neighbours by adjustable connections 33. The construction and method of operation of these connections are identical with those of the connections 3 incorporated in the flange element 1 and no further description thereof is deemed to be necessary.

What I claim is:

1. A clamping arrangement for a pipe joint, comprising collar and flange elements adapted for engagement with the respective pipes and for being drawn together axially of the pipes to compress a packing for the joint, one of said elements being segmentally divided, and means for connecting the segments of such element together circumferentially thereof, said connecting means between at least two adjacent segments comprising an eccentric or cam-action device including an eccentric or cam-shaped bush, operative between the adjacent ends of said two segments and operative on rotation to move these two segments away from each other to increase the total circumferential length of the element and to move them towards each other to decrease said circumferential length.

2. A clamping arrangement according to claim 1, wherein two independently rotatable eccentric or cam-shaped bushes are respectively engaged with the adjacent ends of the segments connected, and are perforated for mounting on and rotating about a common pivot.

3. A clamping arrangement according to claim 1, wherein two independently rotatable eccentric or cam-shaped bushes are respectively engaged with the adjacent ends of the segments connected, and are perforated for mounting on and rotating about a common pivot, the adjacent inner end faces of said bushes being provided with complementary formations adapted to interengage so as to locate the respective segments circumferentially in any of a predetermined number of positions.

PERCY GRAHAM JOHNSON.